(12) United States Patent
Hoole et al.

(10) Patent No.: US 12,155,517 B2
(45) Date of Patent: Nov. 26, 2024

(54) ADAPTING 5G NR SPATIAL COMPONENTS FOR STACKED TRANSMISSION VIA RF/OPTICAL MEDIA

(71) Applicant: CHARTER COMMUNICATIONS OPERATING, LLC, St. Louis, MO (US)

(72) Inventors: Elliott Hoole, Parker, CO (US); Diwelawatte Jayawardene, Centennial, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 126 days.

(21) Appl. No.: 17/742,863

(22) Filed: May 12, 2022

(65) Prior Publication Data
US 2023/0370315 A1    Nov. 16, 2023

(51) Int. Cl.
*H04L 27/26* (2006.01)
*H04L 12/28* (2006.01)

(52) U.S. Cl.
CPC ...... *H04L 27/2626* (2013.01); *H04L 12/2801* (2013.01); *H04L 27/2605* (2013.01)

(58) Field of Classification Search
CPC ............. H04L 27/2626; H04L 12/2801; H04L 27/2605; H04B 1/0483; H04B 10/2575; H04B 10/25752; H04Q 2213/13012
See application file for complete search history.

(56) References Cited

U.S. PATENT DOCUMENTS

| | | | |
|---|---|---|---|
| 7,784,344 B2 | 8/2010 | Pavelescu et al. | |
| 8,351,773 B2 | 1/2013 | Nasiri et al. | |
| 9,121,922 B2 | 9/2015 | Jarvis et al. | |
| 10,349,218 B2 | 7/2019 | Talluri et al. | |
| 11,026,004 B2 | 6/2021 | Das | |
| 2003/0147655 A1* | 8/2003 | Shattil | H04L 27/00 398/76 |
| 2008/0267210 A1* | 10/2008 | Sidana | H04L 65/611 370/449 |

(Continued)

OTHER PUBLICATIONS

Universal Mobile Telecommunications System (UMTS); LTE; 3GPP system to Wireless Local Area Network (WLAN) interworking; System description (3GPP TS 23.234 version 13.1.0 Release 13); ETSI TS 123 234 V13.1.0 (Mar. 2017). 18 pgs.

*Primary Examiner* — Sophia Vlahos
(74) *Attorney, Agent, or Firm* — Patent Beach PC

(57) ABSTRACT

Various embodiments comprise systems, methods, architectures, mechanisms and apparatus for spatially combining a plurality of 5G new radio (NR) carrier signals or channels for transport via a common frequency channel through a hybrid fiber coax (HFC) or other communications medium link or network. To overcome a loss of receiver ability to discriminate/process individual spatial components, each baseband signal and/or carrier signal including a spatial component has imparted to it a respective channel component Øn configured to modify amplitude, phase shift, and/or time delay of the baseband signal and/or carrier signal such that multiple spatial component bearing signals stacked/combined within a HFC frequency channel or slot include channel characteristics sufficiently distinct so as to enable a receiver to identify, discriminate, and otherwise process desired spatial components.

21 Claims, 4 Drawing Sheets

(56) References Cited

U.S. PATENT DOCUMENTS

| | | | |
|---|---|---|---|
| 2011/0091217 A1* | 4/2011 | Liu | H04B 10/25752 |
| | | | 398/116 |
| 2020/0295941 A1* | 9/2020 | Daniel | H04L 9/50 |
| 2021/0050906 A1* | 2/2021 | Campos | H04B 7/12 |

* cited by examiner

ADAPTING 5G NR SPATIAL COMPONENTS FOR STACKED TRANSMISSION VIA RF/OPTICAL MEDIA

FIELD OF THE DISCLOSURE

The present disclosure generally relates to data networking and, more particularly, to adapting multiple spatial components for transmission via a HFC transmission medium.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

U.S. Pat. No. 11,026,004 discloses individual antenna signals from a 5G NR being frequency translated and placed onto respective hybrid fiber coax (HFC) cable for distribution to one or more users (i.e., each HFC frequency channel carries a single spatial component for a given 5G NR). While this technique works reasonably well, it would be preferable to have each HFC frequency channel carry multiple spatial components. Unfortunately, such a configuration results in numerous problems with respect to receiver discrimination of individual spatial component, the impact of linear or non-linear errors, and so on.

SUMMARY

Various deficiencies in the prior art are addressed by systems, methods, and apparatus for spatially combining a plurality of 5G new radio (NR) carrier signals or channels for transport via a common frequency channel through a hybrid fiber coax (HFC) or other communications medium link or network. To overcome a loss of receiver ability to discriminate/process individual spatial components, each baseband signal and/or carrier signal including a spatial component has imparted to it a respective channel component Øn configured to modify amplitude, phase shift, and/or time delay of the baseband signal and/or carrier signal such that multiple spatial component bearing signals stacked/combined within a HFC frequency channel or slot include channel characteristics sufficiently distinct so as to enable a receiver to identify, discriminate, and otherwise process desired spatial components.

Further embodiments adapt imparted channel components Øn to provide specific pre-emphasis of spatial components configured to reduce linear and/or non-linear transmission medium artifacts without the use of specific compensation circuitry (e.g., tilt processing circuitry), to reduce a negative impact of existing compensation circuitry, and/or to perform other functions.

According to one embodiment, a method of spatially combining 5G new radio (NR) carrier signals for transport via a communications link having associated with it tilt compensation circuitry, each of the 5G NR carrier signals comprising an orthogonal frequency division multiplexing (OFDM) signal having respective In-phase (I) and Quadrature (Q) data multiplexed thereon, the method comprising: combining, onto an intermediate frequency (IF) carrier signal, each of N 5G NR antenna signals having imparted thereto a respective phase shift and a respective delay, wherein N is an integer greater than one; and frequency translating the IF carrier signal bearing the N 5G NR antenna signals to a desired slot on the communications link; wherein the delay characteristics are constrained to be within a corresponding OFDM symbol cyclic prefix window length.

Additional objects, advantages, and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
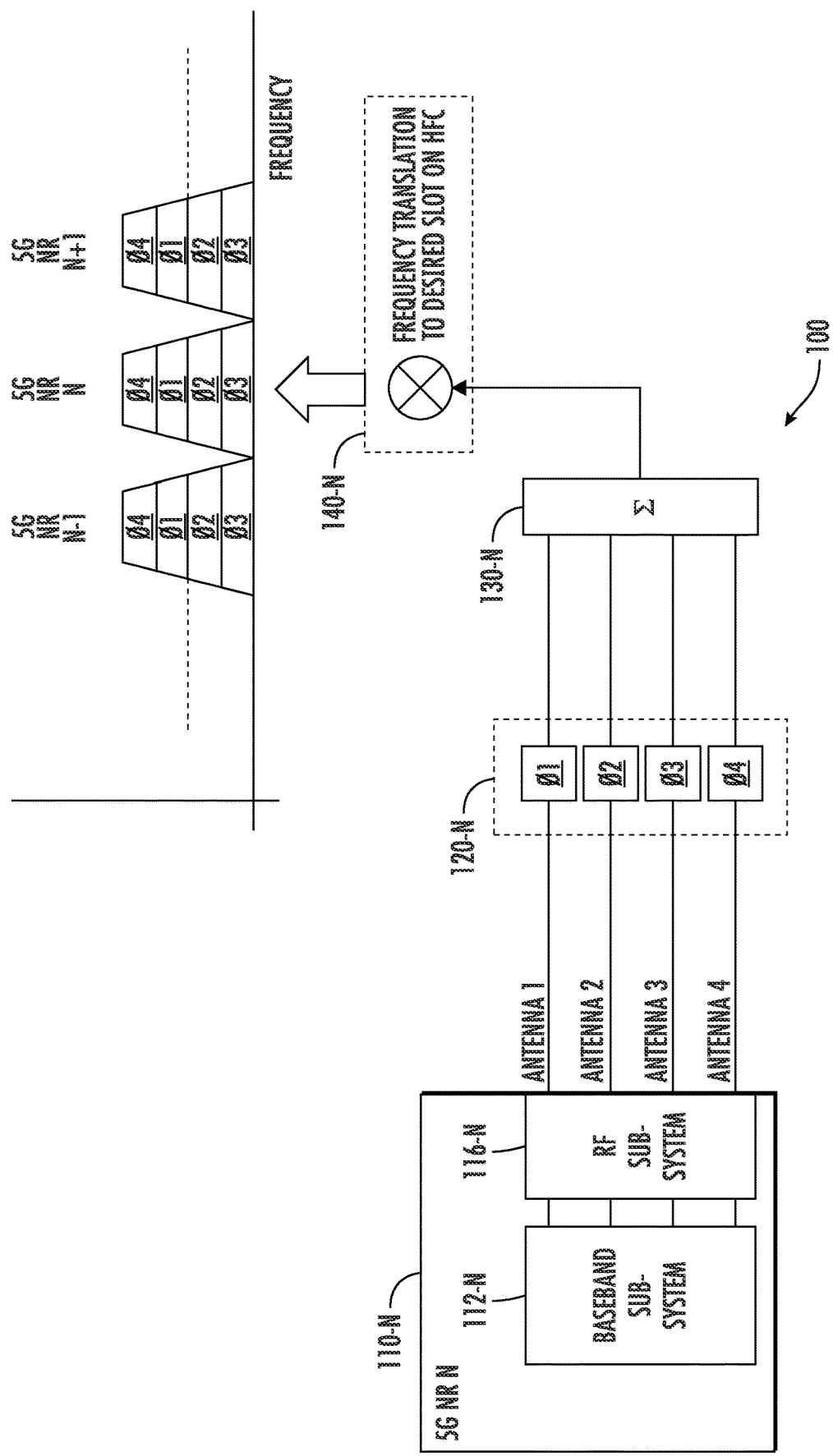
FIG. 1 depicts a graphical representation of processing spatially diverse data streams at 5G RF carrier frequencies according to an embodiment.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various deficiencies in the prior art are addressed by systems, methods, and apparatus for spatially combining a plurality of 5G new radio (NR) carrier signals or channels for transport via a common frequency channel through a hybrid fiber coax (HFC) or other communications medium link or network. To overcome a loss of receiver ability to discriminate/process individual spatial components, each baseband signal and/or carrier signal including a spatial component has imparted to it a respective channel component $Øn$ configured to modify amplitude, phase shift, and/or time delay of the baseband signal and/or carrier signal such that multiple spatial component bearing signals stacked/combined within a HFC frequency channel or slot include channel characteristics sufficiently distinct so as to enable a receiver to identify, discriminate, and otherwise process desired spatial components.

Further embodiments adapt imparted channel components $Øn$ to provide specific pre-emphasis of spatial components configured to reduce linear and/or non-linear transmission medium artifacts without the use of specific compensation circuitry (e.g., tilt processing circuitry), to reduce a negative impact of existing compensation circuitry, and/or to perform other functions.

Thus various embodiments address issues that arise when a transmission environment is too sterile such that signal artifacts normally imparted to spatial component bearing signals transmitted therethrough (e.g., such as induced by the different signal transmission paths) are not available to a receiver configured to use such signal artifacts to discriminate between the various spatial components.

The various embodiments will primarily be discussed within the context of a cable multiple systems operator (MSO) ingesting content from multiple different sources (e.g., national networks, content aggregators, etc.), processing the ingested content, and deliver it to the MSO subscribers via a hybrid fiber coax (HFC) cable/fiber network or link thereof, such as to a subscriber's set-top box or Data Over Cable Service Interface Specifications (DOCSIS) cable modem. Other types of operators, systems, networks and the like are also contemplated as benefitting from the various embodiments.

As discussed herein, the exemplary HFC link is operated in a time division duplex (TDD) manner to provide thereby a plurality of 100 MHz TDD slots spectrally located between lower and upper frequency limits. Other types of links, types of time division operation, spectral slot sizes, and/or related modes of operation are also contemplated as benefitting from the various embodiments.

Various linear and non-linear errors may be imparted to a signal passing through the HFC or other transmission medium. Signal attenuation along the HFC link/network increases with increasing frequency due to coaxial conductor length and various other factors. Other factors impact transmission medium performance, such as the velocity factor (VF), also known as wave propagation speed or velocity of propagation (VoP), which is defined as the ratio of the speed at which a wavefront (of an electromagnetic or radio frequency signal, a light pulse in an optical fiber or a change of the electrical voltage on a copper wire) propagates over the transmission medium, to the speed of light (c, approximately 3E08 m/s) in a vacuum.

To address attenuation and/or performance impact of other factors, the HFC signal is subjected to one or more pre-processing steps such as tilt compensation, which is used to compensate for non-linearity across different frequencies carried by the medium (e.g., coaxial cable). For instance, higher frequencies may have a higher loss per unit distance when travelling on the medium as compared to lower frequencies travelling the same distance on the same medium. When a high bandwidth signal (e.g. 50-1650 MHZ) is transmitted on a coax line, its loss across the entire frequency bandwidth will not be linear, and may include shape artifacts such as a slope (or "tilt"), and/or bends or "knees" in the attenuation curve (e.g., akin to a low-pass filter). Such non-linear losses may be compensated for to achieve optimal performance on the medium, by the use of tilt compensation circuitry on an RF stage of a node or other device.

The various embodiments provide for each HFC frequency channel (e.g., TDD slot) carrying at least two combined spatial components of a corresponding 5G NR before the frequency translation process onto the TDD slot. However before the 5G NR spatial components are combined, an artificial communications channel characteristic is introduced to each antenna signal in order to allow the receiving equipment to properly receive the spatial streams. The artificial communications channel characteristic comprises a respective modification in one or more of the amplitude, phase, and delay of each of the spatial streams such that the modified spatial streams may be combined into a common HFC frequency channel, and the subsequent processing of the common HFC frequency channel by linear or nonlinear compensation circuitry (e.g., tilt compensation circuitry) will not result in an unusable RF signal at a receiver.

FIG. 1 depicts a graphical representation of processing spatially diverse data streams at 5G RF carrier frequencies according to an embodiment. Specifically, FIG. 1 depicts imparting a respective channel component $Øn$ via carrier signal shaping to each of a plurality 5G RF carrier signals having modulated thereon respective spatially diverse data streams (e.g., multiple independent parallel data streams such as part of a multiple input multiple output (MIMO) channel N).

Referring to FIG. 1, an $N^{th}$ 5G NR module 110-N of a plurality (not shown) of 5G NR modules 110 comprising at least a baseband sub-system 112-N and a RF subsystem 116-N is configured to provide, illustratively, four RF carrier signals (Antenna1-Antenna4) of the same/common frequency, each having modulated thereon a respective spatially diverse data stream. The four RF carrier signals (Antenna1-Antenna4) are coupled to respective modules (Ø1-Ø4) within a signal shaper 120-N, each of which is configured to impart to its received RF carrier signal a respective artificial communications channel characteristic/component $Øn$, such as defined by the following equation:

$$\phi_n = \alpha_n e^{j\theta_n} + \tau_n$$

$\alpha_n$ is an amplitude $\theta_n$ is a phase shift $\tau_n$ is a time delay

The output signals of the signal shaper modules (Ø1-Ø4) within the signal shaper 120-N are combined by a signal combiner 130-N, and the combined signal is provided to the HFC frequency shifting or translation module 140 for allocation to a specific RF bandwidth region (e.g., a specific TDD slot for 5G NR-N) for transmission via HFC link or other transmission medium.

The imparting of a respective channel component Øn allows the separate spatial components to co-exist in the same frequency channel on the HFC cable. The imparted channel component (Ø1-Ø4) comprise modifications of amplitude, phase shift, and/or time delay associated with the RF carrier signals (Antenna1-Antenna4) having modulated thereon a respective spatially diverse data stream such that these RF carrier signals (Antenna1-Antenna4) may be "stacked" within a single HFC carrier slot and received/processed correctly by receiving equipment using standard MIMO processing techniques.

Imparting such a channel component Øn may be realized using different lengths of RF transmission lines, or cable paths which introduce different phase shifts and delays to the individual spatial components. The phase shifts may be arbitrary on the interval between 0° and 360° (degrees) as would be seen in actual RF propagation. The delays that are introduced are constrained to be within the OFDM symbol's cyclic prefix window length. For example, a 5G system with 30 kHz sub-carrier spacing has an OFDM symbol cyclic prefix duration that is 2.34 microseconds long.

Figure 2:
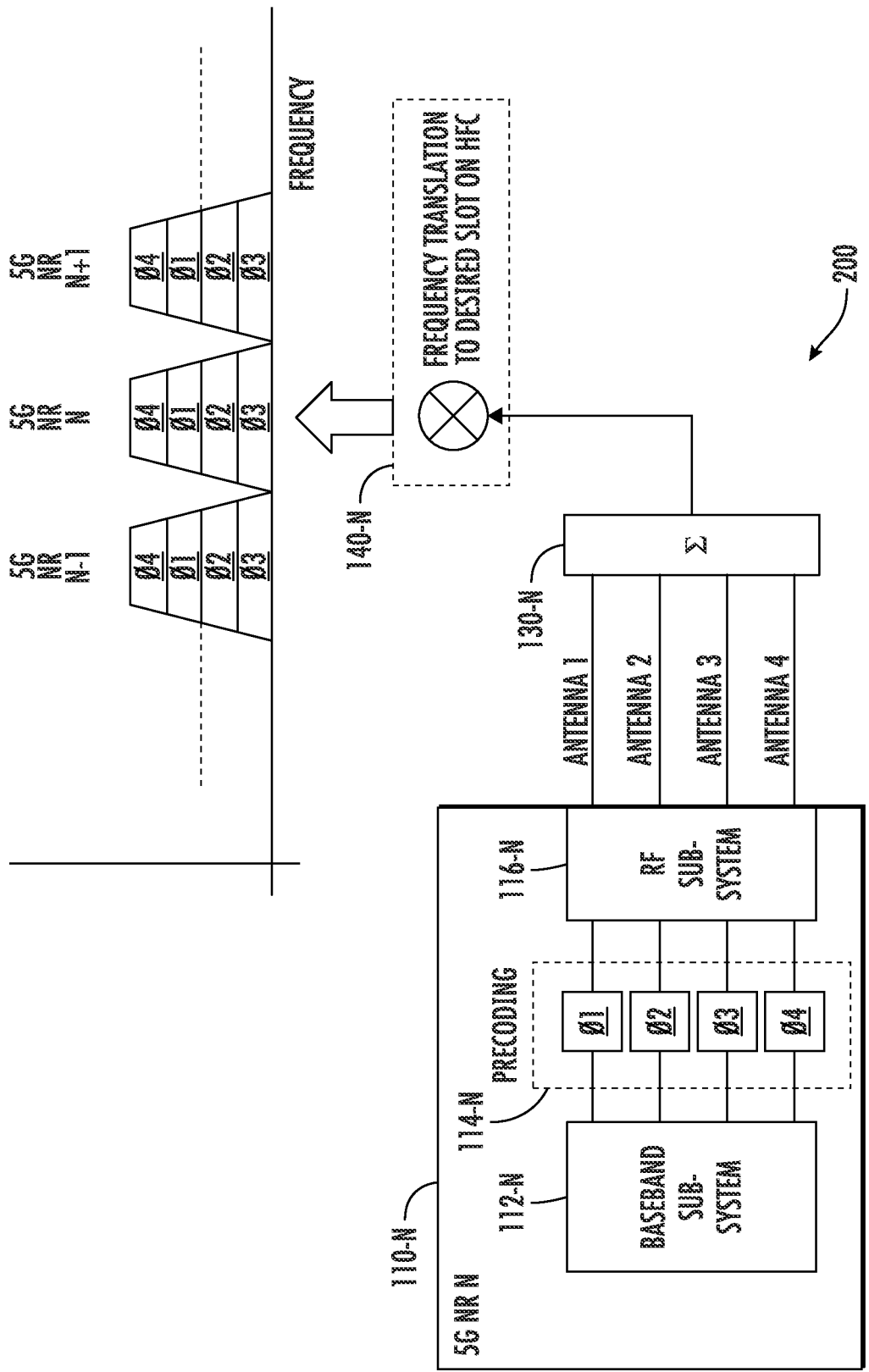
FIG. 2 depicts a graphical representation of processing data streams at 5G baseband frequencies according to an embodiment.

FIG. 2 depicts a graphical representation of processing data streams at 5G baseband frequencies according to an embodiment. Specifically, FIG. 2 depicts imparting a respective channel component Øn via baseband signal precoding of each of a plurality 5G baseband signals comprising respective data streams prior to modulating the 5G baseband signals onto respective RF carrier signals for subsequent combination and allocation to a specified RF bandwidth region for transmission via a HFC link or other transmission medium as discussed herein.

Referring to FIG. 2, and as discussed above with respect to FIG. 1, an $N^{th}$ 5G NR module 110-N of a plurality (not shown) of 5G NR modules 110 comprising at least a baseband sub-system 112-N and a RF subsystem 116-N is configured to provide, illustratively, four RF carrier signals (Antenna1-Antenna4) of the same/common frequency, each having modulated thereon a respective spatially diverse data stream.

The 5G NR module 110-N of FIG. 2 further includes a precoder 114-N disposed between the baseband sub-system 112-N and RF subsystem 116-N, and configured to process some or all of the plurality of 5G baseband signals passing therebetween. Specifically, as depicted in FIG. 2, the four 5G baseband signals comprising respective data streams are processed by respective precoding modules (Ø1-Ø4) of the precoder 114-N, each of which is configured to impart to a respective its received baseband signal a respective artificial communications channel characteristic/component Øn, such as defined by the following equation:

$$\phi_n = \alpha_n e^{j\theta_n} + \tau_n$$

$\alpha_n$ is an amplitude $\theta_n$ is a phase shift $\tau_n$ is a time delay

The output signals of the precoding modules (Ø1-Ø4) of the precoder 114-N modules (Ø1-Ø4) within the signal shaper 120-N are upconverted to RF carrier signals (Antenna1-Antenna4) which are then combined by a signal combiner 130-N, and the combined signal is provided to a HFC frequency shifting or translation module 140-N for allocation to a specific RF bandwidth region (e.g., a specific TDD slot for 5G NR-N) for transmission via HFC link or other transmission medium.

As discussed above with respect to FIG. 1, the imparting of a respective channel component Øn allows the separate spatial components to co-exist in the same frequency channel on the HFC cable. The imparted channel component (Ø1-Ø4) comprise modifications of amplitude, phase shift, and/or time delay associated with the RF carrier signals (Antenna1-Antenna4) having modulated thereon a respective spatially diverse data stream such that these RF carrier signals (Antenna1-Antenna4) may be "stacked" within a single HFC carrier slot and received/processed correctly by receiving equipment using standard MIMO processing techniques.

Imparting such a channel component Øn may be realized using different lengths of RF transmission lines, or cable paths which introduce different phase shifts and delays to the individual spatial components. The phase shifts may be arbitrary on the interval between 0° and 360° as would be seen in actual RF propagation. The delays that are introduced are constrained to be within the OFDM symbol's cyclic prefix window length. For example, a 5G system with 30 kHz sub-carrier spacing has an OFDM symbol cyclic prefix duration that is 2.34 microseconds long.

Whether via carrier frequency processing (FIG. 1) or baseband processing (FIG. 2) or some combination thereof, the imparting an artificial communications channel characteristic/component Øn may be used to achieve various purposes and/or use cases.

In various embodiments, imparting an artificial communications channel characteristic/component Øn may be used to provide pre-emphasis of pre-processing selected to limit linear and/or non-linear errors which may be imparted to the RF carrier signal or its contents while it is traversing a HFC medium or other transmission medium. For example, an artificial communications channel characteristic/component Øn may be selected effect a tilt processing of the RF carrier signal, or negate the effect of existing tilt processing circuitry known to be used with respect to the HFC or other transmission medium. For example, the amplitude component of the channel offsets can be used by the equipment transmitters on both ends of a HFC connection to provide tilt compensation for the cable losses. In long cable runs it is well known that the signals at higher frequencies experience more loss in a given distance that those at lower frequencies. The standard technique to compensate for this effect is to install tilt compensation amplifiers in the cable plant. However, using the techniques described herein, such tilt compensation may be introduced by using a channel offset with a larger amplitude at higher frequencies on the cable.

In various embodiments, imparting an artificial communications channel characteristic/component Øn may be used to replicate signal artifacts caused by the impact of typical environmental conditions on RF carrier signal propagation (e.g., fade, reflection, material penetration losses, etc.) such as caused by buildings or other environmental conditions, which signal artifacts are used by 5G receivers to discriminated between different multiple input multiple output (MIMO) channels.

The imparted phase shift may be arbitrary or fixed. The delay may be fixed, though it should be sufficient to enable separation of component signals at a receiver.

Advantageously, by using phase shifting as discussed above, the number of frequency domain channels that may be used is increased (i.e., throughput multiplied).

Figure 3:
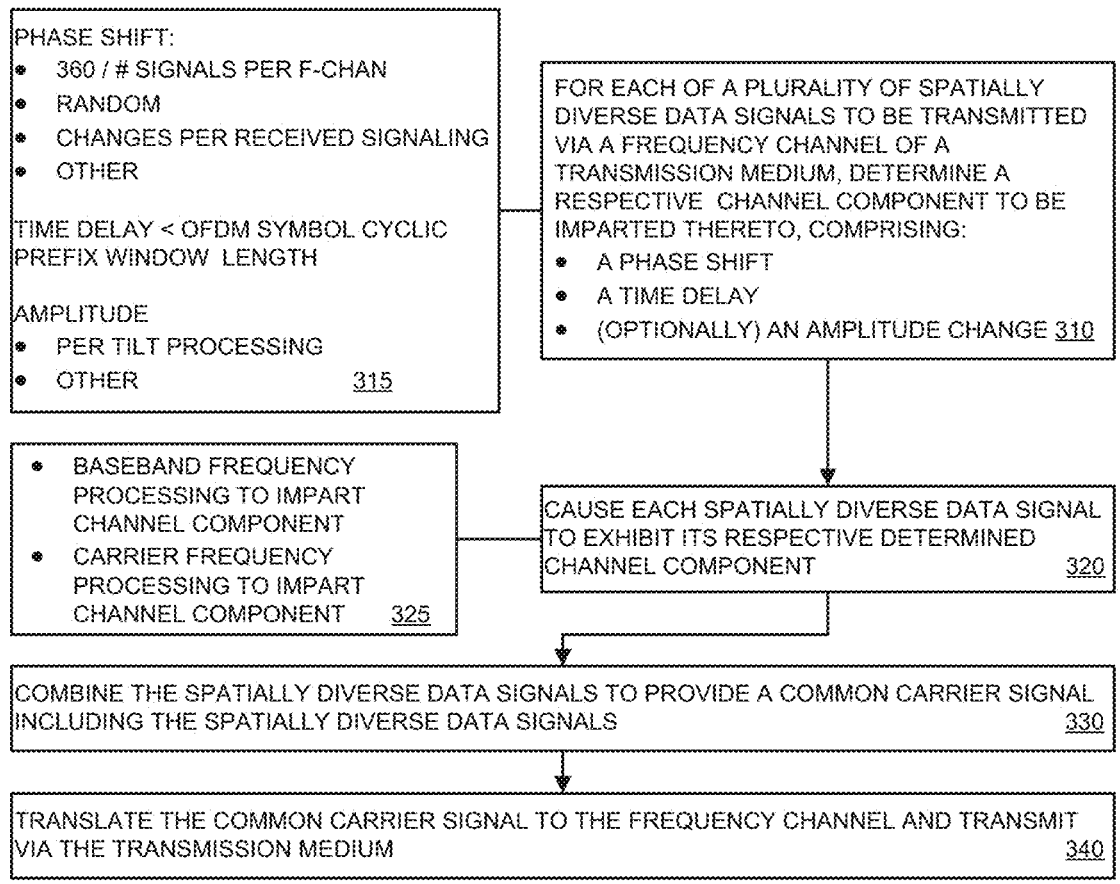
FIG. 3 depicts a method according to an embodiment.

FIG. 3 depicts a method according to an embodiment. Specifically, FIG. 3 depicts a method 300 substantially in accordance with the operation discussed herein with respect to the other figures.

At step 310, for each of a plurality of spatially diverse data signals to be transmitted via a frequency channel of a transmission medium, determine a respective channel component to be imparted thereto, comprising: a phase shift, a time delay, and (optionally) an amplitude change such as discussed above with respect to FIGS. 1-2. Referring to box 315, the phase shift for each signal may comprise 360/# signals to be used in the frequency channel, a random phase shift, or some other amount. Further, the phase shift may change in response to signaling received from a receiver or management entity. The time delay is less than the OFDM symbol cyclic prefix window length. The amplitude may be increased to impart tilt processing or for some other purpose.

At step 320, each spatially diverse data signal is caused to exhibit its respective determined channel component. Referring to box 315, this may comprise carrier frequency processing to impart the channel component (e.g., per FIG. 1) or baseband frequency processing to impart channel component (e.g., per FIG. 2).

At step 330, the spatially diverse data signals are combined to provide a common carrier signal including the spatially diverse data signals.

At step 340, the combined spatially diverse data signals are shifted or translated to the appropriate frequency channel for transmission and transmitted via the HFC or other transmission medium.

In various embodiments, the amount of phase shift is predetermined. The predetermined amount may be based upon a number of spatial components to be combined. For example, the predetermined phase shift may be 360°/N spatial components, such as 90° phase shift if four spatial components, 45° if eight spatial components and so on. In other embodiments, the predetermined phase shift may be different for some or all of the spatial components. For example, rather than a predetermined 90° phase shift for each of four spatial components, the phase shift may comprise 45° predetermined phase shift for two of the spatial components and a phase shift of 135° for the remaining two components. Other/different amounts of phase shift may be selected such as in response to selected channel coding techniques (so as to minimize interferences) or bandwidth requirements (so as to allocate more bandwidth to a channel (s)) and so on.

Generally speaking, each of the plurality of spatially diverse data signals is associated with a respective phase shift of D°. The phase shifts D° of the spatially diverse data signals may be the same or different for each of the spatially diverse data signal (i.e., the phase shifts may be arbitrary or non-regular). The phase shifts D° of the spatially diverse data signals may add up to 360°, or may add up to something less than 360° (i.e., a summation of the respective spatially diverse data signal phase shifts $D_1°, D_2°, \ldots D_N°$ may result in a total phase shift $D_T°$ less than or equal to 360°).

In various embodiments, the amount of phase shift is adapted in response to a control signal from a receiver or transceiver at a far end of the HFC or other transmission medium. For example, the far end receiver/transceiver may request that the phase shift be increased or decreased for some purposes, such as to improve spatial component discrimination (e.g., in response to a computation performed thereat).

In various embodiments, the amount of phase shift is adapted in response to increase or decreases in capacity or demand. For example, as demand increases the phase shift is adjusted. This may be performed in response to signaling from a far end receiver/transceiver, from a network management entity, or from some other entity.

In various embodiments, the amount of phase shift is adapted in response to increased or decreased ability of a far end receiver/transceiver to discriminate desired spatial components such as due to performance specifications, monitoring error processing, and/or other indications of a "sufficient" discrimination success. Where multiple far end receivers/transceivers are easily selecting/processing desired spatial components, the number of spatial components included within a frequency slot may be increased (e.g., as long as error processing is not overwhelmed).

In various embodiments, lower or more inherently noisy frequencies are selectively not processed in accordance with the embodiments since these frequencies will exhibit characteristics sufficient to enable receiver discrimination of desired spatial components.

In various embodiments, different spectral regions are treated differently in terms of imparting an artificial communications channel characteristic/component Øn. For example, since lower frequency bands (e.g., up to 850 MHz) propagate further than higher frequency bands (e.g., above 900 MHz), these two (or more) spectral portions may be processed differently such as, for example, where the number of phase shifts implemented at frequencies at or below 850 MHz is different than the number of phase shifts implemented at frequencies above 850 MHz. In at least some of these embodiments the receiver may adaptively adjust its operating frequency/frequencies as appropriate. These are other modifications where spectral regions are treated differently may be based upon the phase compensation, error processing, and/or other characteristics or limitations of the intended receiver equipment.

Various dynamic phase shifting embodiments implement a desired number of phases per chunk, or per chunk in portions of the band based on the RF characteristics of those portions.

Various dynamic phase shifting embodiments are configured to adapt to the non-ideal nature of the coax and the inherent limitations of some spectral regions. For example, given higher loss at higher frequencies, boost the amplitude of the higher frequencies. Similar to a tilt amplifier (i.e., a software tilt amplifier implementation). Amplitude can also sense signal level at receiver and protocol will tell transmitter to increase/decrease amplitude.

Various embodiments do not require the use of DOCSIS; rather, these embodiments contemplate sending NR signal and all error correction in a 100 MHz channel implemented over coax in a "cleaner" environment so as to increase the effective bandwidth of a given time slot or channel.

Various embodiments contemplate that standard MIMO decoding on receiver will still operate in the same/standard manner, but which allow the use of HFC to convey these signals in a manner by which standard decoding will actually work (back to the different path/artifacts aspect to enable this recovery).

Various embodiments are configured to aggregate multiple channels for tiered speeds (different subscriber tiers, Platinum, Gold, Silver). As an example of a carrier aggregation use case: Subscriber A gets 200 MHz per channel, while B gets 400 MHz per channel. Standard 3GPP carrier aggregation (need feedback loop with authentication/policy information to allow higher tier use or not). Enable aggregation of multiple channels if subscriber has paid for this tier. Adjacent spectrum preferred but not needed.

Various embodiments may operate using 3, 5, or some other arbitrary number of phases. Various embodiments, when determining adaptive phase shift, use RF condition measurements/conditions to decide an optimal number of phases.

Various use cases as described herein operate to increase capacity such as by using packet loss, TCP slow start triggers, etc. to determine phase shift adjustments. In some embodiments an eigenmatrix is computed, and the results fed back to a source so as to responsively enable phase shifts and other changes to antenna elements/configurations.

Various embodiments contemplate that the region below 850 MHz may be beneficially utilized for introducing time delays (creating phase ramps in the frequency domain), and the region above 850 MHz may be beneficially utilized for introducing simple phase and amplitude shifts since additional frequency domain phase ramps may be more difficult for the compensation ability of some receivers.

Service Provider Network Architecture

Figure 4:
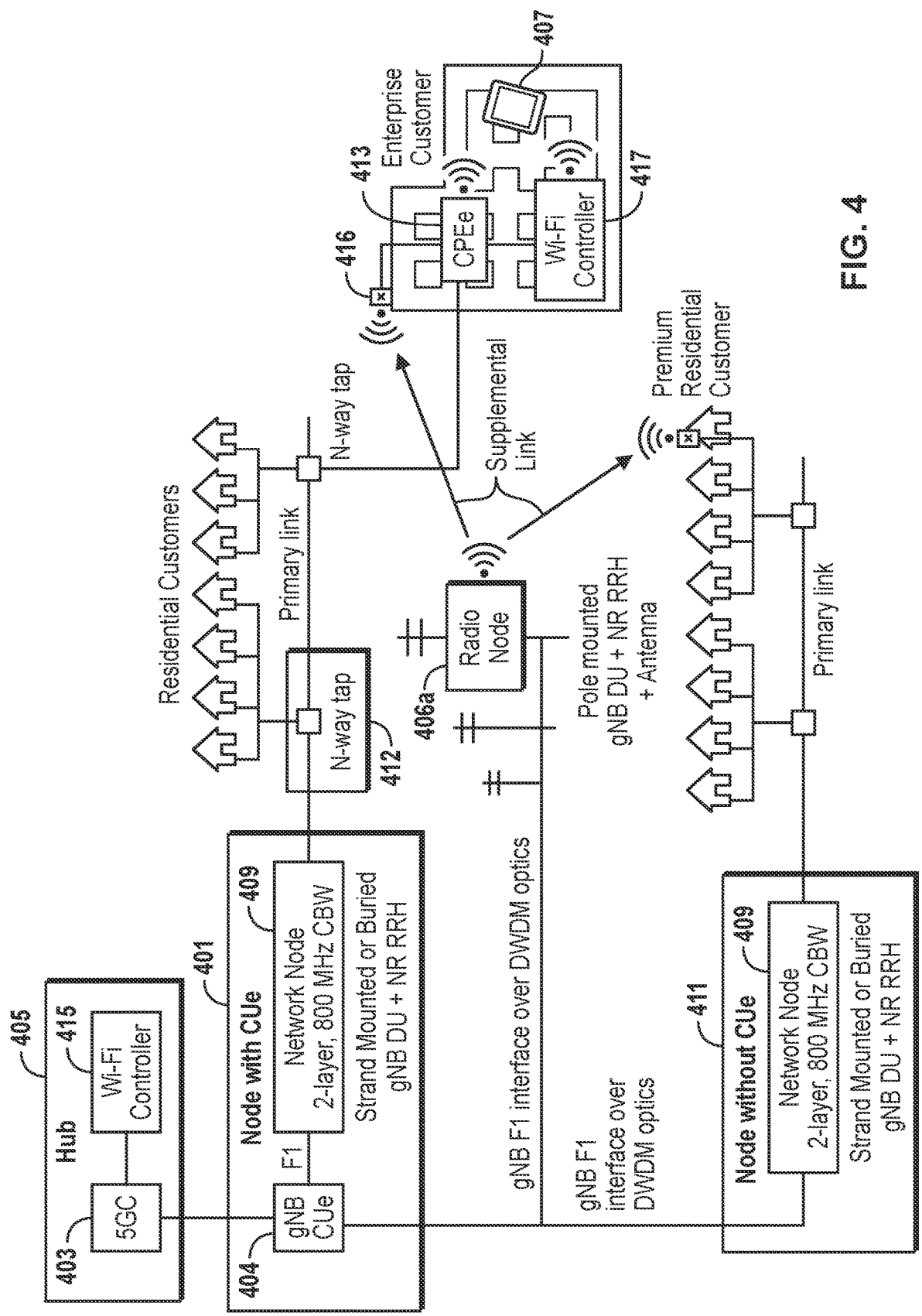
FIG. 4 depicts a high level block diagram of an enhanced service provider network benefiting from the various embodiments.

FIG. 4 depicts a high level block diagram of an enhanced service provider network benefiting from the various embodiments and including provider equipment (PE) configured to operated in accordance with the various embodiments to support the distribution of communications signals normally transmitted via air (e.g., OFDM mobile communications signals such as 4G/LTE, 5G and the like) between various PE nodes (transmitting nodes or receiving nodes), as well as between such PE nodes and various customer premises equipment (CPE).

As illustrated, the enhanced service provider network architecture 400 includes one or more hubs 40S within the MSO network (e.g., whether near edge portions of the network, or further towards the core), including a 5G NR core (5GC) 403. The hub 405 includes a WLAN controller process 415, and services one or more "enhanced" nodes 401, which each include a gNB CUe 404 and a network radio node 409, described in greater detail below. The nodes 401 utilize HFC infrastructure, including N-way taps 412 to deliver RF waveforms to the various served premises (including the enhanced CPE or CPEe) 413 and ultimately the user device(s) 407 (e.g., 3GPP-enabled UEs).

Also serviced by the node 401 are one or more non-CUe enabled nodes 411 including 4G/4.5G/5G enabled network radio nodes 409, which service additional premises as shown.

In the illustrated embodiment, the nodes 401, 411 are backhauled by optical fiber, although this is merely illustrative, as other types of backhauls including e.g., high-bandwidth wireless may be used consistent with the present disclosure.

Similarly, one or more pole-mounted radio nodes 406 *a* (and potentially other mobile client devices enabled for DU-type functionalities; e.g., authorized to receive data from another node or client device, and broadcast/receive signals according to the user domain frequency band) are backhauled to the MSO network via optical fiber (or other medium); these nodes 406 provide, inter alia, supplemental capacity/coverage for both indoor and outdoor (and mobility) scenarios as described in greater detail below.

In one exemplary embodiment, radio nodes 406 *a* are located on an "edge" of a network (i.e., functioning as a network node proximate to the premises and away from the core), and are enabled for 4G and/or 5G communications as described in greater detail below. A given DU that provides 5G coverage to the premises thereby supplements the ultra-low latency and high-bandwidth services by the CUe 404. Moreover, as described further below, the CUe may be logically and functionally grouped with one or more DUes 406 to together make up a gNB Prescribed unlicensed and/or licensed frequency bands are utilized by the nodes 406 *a*. For example, in one implementation, the disclosed solution supports one or more prescribed subsets of NR and NR-U band combinations as defined by 3GPP, depending on the particular application(s) anticipated by the installation and the locale in which it is installed (including for example whether other operators or carriers such as MNOs are utilizing licensed spectrum within the prescribed area, and which frequency bands such operators are using). It will also be appreciated that so-called "quasi-licensed" spectrum (such as for instance that within the 3.55-3.70 GHz CBRS bands in the U.S.) may be utilized consistent with the methods and apparatus described herein.

In one variant, as noted above, mobile devices may function as intermediary nodes or transient "jumping points" Such devices may be those owned by subscribers of the hub or core providing the managed network services who have opted into (or not opted out) of use of their eligible devices as nodes. In other variants, devices owned by subscribers of a different core (e.g., managed by a different entity) may be included in the network of nodes. As an aside, such networking schemes are often generally referred to as "fog networking," a decentralized computing infrastructure in which data, computations, storage, and applications are distributed in an efficient manner between the data source and the destination (e.g., a "cloud" server, premises equipment, end user device) as opposed to a more highly centralized architecture.

A Wi-Fi router device 417 is also present in the served premises to provide WLAN coverage, in conjunction with the controller 415 at the hub 405. The centralized Wi-Fi controller 415 is also utilized in the exemplary architecture 400 for tight-interworking and better mobility between the 3GPP and Wi-Fi access technologies where the Wi-Fi router is either integrated with the consumer premises equipment (e.g., enhanced CPE or CPEe) or connected to it. In various embodiments, one or more intermediary nodes (e.g., radio node 406 *a*) located between the CUe 404 and the served premises are utilized to provide additional coverage and bandwidth to the premises. Then, mobility between the 3GPP and Wi-Fi channels for any user can be triggered for the best data throughput, such as based on (i) estimation of the RF quality of the Wi-Fi channel toward the user, and/or (ii) the degree of congestion of the Wi-Fi router, and not just the Wi-Fi received signal strength indicators (RSSI) measured at the mobile device, the latter which may not be representative of the service quality that can be obtained by the user.

In the exemplary configuration, the controller (e.g., Wi-Fi Controller 415) is configured to choose the best (optimal)

wireless connection available to it based on performance (as opposed to coverage/coverage area alone). Typically today, a preferred method of access is predetermined based on its received signal strength and/or as a preferred means (e.g. Wi-Fi could be defined as the preferred method of access to off-load the mobile wireless network) However, this method suffers from the drawback of blind 'stickiness' to a technology, without considering the end user experience. Given that in exemplary embodiments of the architecture described herein, both Wi-Fi and licensed/unlicensed 3GPP access technologies are both controlled by the network operator (e.g. MSO), there is no need to prefer an access method, such as to purely to offload a user's traffic. The decision to offload or steer a user to a given access technology, can be based upon other criteria, such as e.g., a select set of Key Performance Indicators (KPIs) such as the user perceived latency, throughput, packet loss, jitter and bit/packet/frame error rates as measured in real-time at any given layer (e.g., L1, L2 or L3) by the network. For instance, in one implementation, once a target KPI threshold is triggered, the switching of the user can be triggered by either the AMF function (for 3GPP) or Wi-Fi Controller. This switching may then trigger a session establishment at the alternate access medium to transfer the user to that technology. This helps optimize QoE for connected users, since the controller will always be attempting to holistically optimize the connection versus merely making decisions based on coverage or signal strength alone.

This architecture also obviates the problematic transition between premises Wi-Fi and cellular, thereby enabling content consumption while the user is mobile, with no reduction in QoE or interruptions due to e.g., new session establishment in the cellular network. This is accomplished by, inter alia, communication between the Wi-Fi controller 415 and the CUe 404, such that the CUe can remain cognizant of both Wi-Fi and 3GPP channel status, performance and availability. Advantageously, in exemplary embodiments, the foregoing enhanced mobility is provided without the need for any module or customized application software or protocols of the user device (e.g., mobile UE), since all communication sessions (whether between the CPEe and the UE, or the supplemental radio access node and the UE) are both (i) controlled by a common system, and (ii) utilize extant 3GPP (e.g., 4G/4.5G/5G) protocols and architectural elements. In one variant a GPRS Tunneling Protocol (GTP) is utilized for maintenance of session continuity between the heterogeneous RAN technologies (e.g., 3GPP and IEEE Std 802.11). In another variant, a PMIP (Proxy Mobile IP) based approach is utilized for session maintenance/handover. In yet a further variant, techniques described in 3GPP TS 23.234 v13.10, "3GPP system to Wireless Local Area Network (WLAN) interworking: System description (Release 13)," incorporated herein by reference in its entirety, (aka "I-WLAN") based approach is utilized for these purposes. As will be appreciated by those of ordinary skill given the present disclosure, combinations of the foregoing mechanisms may be utilized as well, depending on the particular application (including the two heterogeneous technologies that are party to the session maintenance/handoff).

The MSO network architecture 400 of FIG. 4 is particularly useful for the delivery of packetized content (e.g., encoded digital content carried within a packet or frame structure or protocol) consistent with the various aspects of the present disclosure. In addition to on-demand and broadcast content (e.g., live video programming), the system of FIG. 4 may deliver Internet data and OTT (over-the-top) services to the end users (including those of the DUe's 406 a) via the Internet protocol (IP) and TCP (i.e., over the 5G radio bearer), although other protocols and transport mechanisms of the type well known in the digital communication art may be substituted.

The architecture 400 of FIG. 4 further provides a consistent and seamless user experience with IPTV over both wireline and wireless interfaces Additionally, in the IP paradigm, dynamic switching between unicast delivery and multicast/broadcast is used based on e.g., local demand. For instance, where a single user (device) is requesting content, an IP unicast can be utilized. For multiple devices (i.e., with multiple different IP addresses, such as e.g., different premises), multicast can be utilized. This approach provides for efficient and responsive switching of delivery and obviates other more equipment/CAPEX-intensive approaches.

The exemplary configuration of the architecture disclosed herein provides that substantially all traffic traversing the architecture is IP-based. Advantageously, this "all-IP" approach enables flexible use of the available bandwidth on the transmission medium for all applications dynamically, based on for instance the demand of each such application at any given period or point in time.

In certain embodiments, the service provider network 400 also advantageously permits the aggregation and/or analysis of subscriber- or account-specific data (including inter alia, correlation of particular CUe or DUe or E-UTRAN eNB/ femtocell devices associated with such subscriber or accounts) as part of the provision of services to users under the exemplary delivery models described herein. As but one example, device-specific IDs (e.g., gNB ID, Global gNB Identifier, NCGI, MAC address or the like) can be cross-correlated to MSO subscriber data maintained at e.g., the network head end(s) 407 so as to permit or at least facilitate, among other things, (i) user/device authentication to the MSO network; (ii) correlation of aspects of the area, premises or venue where service is provided to particular subscriber capabilities, demographics, or equipment locations, such as for delivery of location-specific or targeted content or advertising or 5G "slicing" configuration or delivery; and (iii) determination of subscription level, and hence subscriber privileges and access to certain services as applicable.

Moreover, device profiles for particular devices (e.g., 3GPP 5G NR and WLAN-enabled UE, or the CPEe 413 and any associated antenna 416, etc.) can be maintained by the MSO, such that the MSO (or its automated proxy processes) can model the device for wireless or other capabilities. For instance, one (non-supplemented) CPEe 413 may be modeled as having bandwidth capability of X Gbps, while another premises' supplemented CPEe may be modeled as having bandwidth capability of X+Y Gbps, and hence the latter may be eligible for services or "slices" that are not available to the former.

Various embodiments contemplate that the methods described above such as with respect to FIGS. 1-3 may be implemented at various network control or distribution elements within a communications network, such as within the enhanced service provider network architecture 400 described above with respect to FIG. 4. For example, various embodiments contemplate that the methods described above such as with respect to FIGS. 1-3 may be used within one or more network elements operating as transmitter nodes, distribution nodes, receiver nodes and the like within the enhanced service provider network architecture 400 (or other communications network), such as the depicted hubs 405, 5GC 403, Wi-Fi controller 415, nodes 401/411, gNB CUes 404, network radio nodes 409, Wi-Fi router device 417s, CPEe 413, user devices 407, and/or portions or components thereof, as well as various other elements as described herein and appreciated by those skilled in the art.

Various elements or portions thereof depicted in the various figures and having functions described herein are implemented at least in part as computing devices having communications capabilities, including for example the hubs 405, nodes 401/411, 5G NR core (5GC) 403, Wi-Fi router device 417s, the CPEe 413, user devices 407, and/or portions or components thereof as well as various other elements as described herein. These elements or portions thereof have computing devices of various types, though generally a processor element (e.g., a central processing unit (CPU) or other suitable processor(s)), a memory (e.g., random access memory (RAM), read only memory (ROM), and the like), various communications interfaces (e.g., more interfaces enabling communications via different networks/RATs), input/output interfaces, servers, authentication systems, and the like.

As such, the various functions depicted and described herein may be implemented at the elements or portions thereof as hardware or a combination of software and hardware, such as by using a general purpose computer, one or more application specific integrated circuits (ASIC), or any other hardware equivalents or combinations thereof. In various embodiments, computer instructions associated with a function of an element or portion thereof are loaded into a respective memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like. It will be appreciated that the term "or" as used herein refers to a non-exclusive "or," unless otherwise indicated (e.g., use of "or else" or "or in the alternative").

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof.

What is claimed is:

1. A method of spatially combining 5G new radio (NR) carrier signals for transport via a communications link, each of the 5G NR carrier signals comprising an orthogonal frequency division multiplexing (OFDM) signal having respective In-phase (I) and Quadrature (Q) data multiplexed thereon, the method comprising:
    combining, onto an intermediate frequency (IF) carrier signal, each of N 5G NR antenna signals having imparted thereto a respective phase shift and a respective delay, wherein N is an integer greater than one; and
    frequency translating the IF carrier signal bearing the N 5G NR antenna signals to a desired slot on the communications link;
    wherein the imparted time delay is constrained to be within a corresponding OFDM symbol cyclic prefix window length.

2. The method of claim 1, wherein a respective phase shift and time delay is imparted to each of N 5G NR antenna signals.

3. The method of claim 1, wherein the communications link comprises a hybrid fiber coax (HFC) link within a network.

4. The method of claim 3, wherein the network comprises a cable multiple systems operator (MSO) network configured to deliver communications services to customer premises equipment (CPE) associated with subscribers thereto.

5. A network architecture configured to support computerized wireless user devices, the network architecture comprising:
    a physical distribution node, the physical distribution node configured to transmit radio frequency (RF) waveforms onto a wireline or optical medium of a network having associated with it propagation loss compensation circuitry, the RF waveforms being orthogonal frequency division multiplex (OFDM) modulated and comprising at least two spatially diverse data streams, each of the at least two spatially diverse data streams being allocated to a common transmission frequency band and having imparted thereto a respective phase shift and a respective time delay, the imparted time delay being within a corresponding OFDM symbol cyclic prefix window length.

6. The network architecture of claim 5, wherein the physical distribution node is further configured for determining for at least some of the RF waveforms an amplitude change configured to impart a tilt processing function to the at least some spatially diverse data streams.

7. The network architecture of claim 5, wherein the at least two spatially diverse data streams comprise N spatially diverse data signals, each with a respective phase shift $D°$, wherein a summation of the respective phase shifts $D_T°$ is less than or equal to 360°.

8. The network architecture of claim 5, further comprising:
    a first plurality of user nodes, each of the first plurality of user nodes in data communication with the wireline or optical medium and comprising a receiver apparatus configured to:
    upconvert a received OFDM modulated waveform to at least one user frequency band to form upconverted waveforms; and
    transmit the upconverted waveforms to at least one wireless user device;
    wherein the transmission of the radio RF waveforms onto the wireline or optical medium of the network comprises an in-phase and quadrature (I-Q) multiplexing of the at least two spatially diverse data streams associated with the common transmission frequency band.

9. The network architecture of claim 8, wherein the propagation loss compensation circuitry comprises tilt compensation circuitry.

10. The network architecture of claim 8, wherein the physical distribution node comprises a provider equipment (PE) node within a cable television distribution system.

11. A computer-implemented method of spatially combining 5G new radio (NR) carrier signals for transport via a communications medium, the computer-implemented method comprising:
    for each of a plurality of spatially diverse data signals to be transmitted via a frequency channel of the communications medium, determining a respective channel component to be imparted thereto, the respective channel components comprising a respective phase shift and a respective time delay, the imparted time delay being constrained to be within a corresponding OFDM symbol cyclic prefix window length;
    causing each spatially diverse data signal to have imparted thereto its respective channel component, the imparted channel components being configured to cause each spatially diverse data signal to exhibit channel components which enable a receiver to discriminate the spatially diverse data signals;
    combining the spatially diverse data signals; and
    shifting the combined spatially diverse data signals to the frequency channel of the communications medium for transmission therethrough.

12. The computer-implemented method of claim 11, wherein the communications medium comprises a hybrid fiber coax (HFC) link within a network operably coupled to a plurality of user nodes, each of the plurality of user nodes comprising a receiver apparatus configured to:
    upconvert a received OFDM modulated waveform to at least one user frequency band to form upconverted waveforms; and
    transmit the upconverted waveforms to at least one wireless user device;
    wherein the transmission of the upconverted waveforms comprises an in-phase and quadrature (I-Q) multiplexing of at least two spatially diverse data streams associated with a common transmission frequency band.

13. The computer-implemented method of claim 11, wherein at least one of the imparted channel components is configured to negate an effect of an extant tilt processing circuitry known to be used with respect to a network comprising the communications medium.

14. The computer-implemented method of claim 11, wherein the causing of each spatially diverse data signal to have imparted thereto its respective channel component comprises imparting a respective channel component, via carrier signal shaping, to each of the plurality 5G NR carrier signals.

15. A method of spatially combining 5G new radio (NR) carrier signals for transport via a communications medium, the method comprising:
    for each of a plurality of spatially diverse data signals to be transmitted via a frequency channel of the communications medium, determining a respective channel component to be imparted thereto, the respective channel components comprising a respective phase shift and a respective time delay, the imparted channel components being configured to cause each spatially diverse data signal to exhibit channel components, the exhibited channel components enabling a receiver to discriminate the spatially diverse data signals;
    causing each spatially diverse data signal to have imparted thereto its respective channel component, wherein the imparted time delay is constrained to be within a corresponding OFDM symbol cyclic prefix window length;
    combining the spatially diverse data signals; and
    shifting the combined spatially diverse data signals to the frequency channel of the communications medium for transmission therethrough.

16. The method of claim 15, wherein causing each spatially diverse data signal to have imparted thereto its respective channel component comprises carrier frequency processing of each of the spatially diverse data signals.

17. The method of claim 15, wherein causing each spatially diverse data signal to have imparted thereto its respective channel component comprises baseband frequency processing of each of the spatially diverse data signals.

18. The method of claim 15, further comprising:
    determining, for at least some of the respective channel components, an amplitude change configured to impart a tilt processing function to the at least some spatially diverse data signals.

19. The method of claim 15, wherein the plurality of spatially diverse data signals comprises four spatially diverse data signals, and the respective phase shifts are 90°.

20. The method of claim 15, wherein:
    the plurality of spatially diverse data signals comprises N spatially diverse data signals, and the respective phase shifts are 360°/N; and
    N is an integer greater than one.

21. The method of claim 15, wherein:
    the plurality of spatially diverse data signals comprises N spatially diverse data signals, each with a respective phase shift D°;
    a summation of the respective phase shifts $D_T°$ is less than or equal to 360°; and
    N is an integer greater than one.

\* \* \* \* \*